United States Patent
Röhrlein

(10) Patent No.: US 7,983,434 B2
(45) Date of Patent: Jul. 19, 2011

(54) IN-THE EAR HEARING AID DEVICE WITH A VENT

(75) Inventor: Gerhard Röhrlein, Höchstadt (DE)

(73) Assignee: Siemens Audiologische Technik GmbH, Erlangen (DE)

( * ) Notice: Subject to any disclaimer, the term of this patent is extended or adjusted under 35 U.S.C. 154(b) by 1199 days.

(21) Appl. No.: 11/702,874

(22) Filed: Feb. 6, 2007

(65) Prior Publication Data

US 2007/0206826 A1  Sep. 6, 2007

(30) Foreign Application Priority Data

Feb. 21, 2006 (DE) .......................... 10 2006 008 044

(51) Int. Cl.
*H04R 25/00* (2006.01)
(52) U.S. Cl. .................... 381/322; 381/324; 381/325
(58) Field of Classification Search .................. 381/322, 381/324–326, 328, 380–381; 181/128–130, 181/135
See application file for complete search history.

(56) References Cited

U.S. PATENT DOCUMENTS

| 4,945,569 A | 7/1990 | Kulman |
| 4,972,488 A | 11/1990 | Weiss et al. |
| 4,987,597 A | 1/1991 | Haertl |
| 5,327,500 A | 7/1994 | Campbell |
| 5,970,157 A | 10/1999 | Yoest |
| 6,164,409 A | 12/2000 | Berger |
| 2005/0074138 A1 | 4/2005 | Saltykov |

FOREIGN PATENT DOCUMENTS

| DE | 3616648 A1 | 11/1987 |
| DE | 38 02 250 C1 | 10/1988 |
| DE | 196 40 796 A1 | 4/1998 |
| EP | 0 310 866 A1 | 4/1989 |
| EP | 0 312 517 A2 | 4/1989 |
| WO | WO 00/03561 A1 | 1/2000 |

*Primary Examiner* — Suhan Ni

(57) ABSTRACT

With a hearing aid device barometric pressure equalization is intended to be achieved in a simple and economical manner in a sound canal between an earpiece and a cerumen protection system with a gas-tight membrane. To this end a pressure equalization canal is proposed, which opens into the sound canal. The pressure equalization canal preferably connects the sound canal to a vent. It can be produced in a simple manner when manufacturing the housing of the hearing aid device using a computer-aided manufacturing method.

20 Claims, 2 Drawing Sheets

IN-THE EAR HEARING AID DEVICE WITH A VENT

CROSS REFERENCE TO RELATED APPLICATIONS

This application claims priority of German application No. 10 2006 008 044.0 filed Feb. 21, 2006, which is incorporated by reference herein in its entirety.

FIELD OF THE INVENTION

The invention relates to an in-the-ear hearing aid device with a housing, said housing having a first housing area facing the eardrum of a user when the hearing aid device is in position and a second housing area facing away from the eardrum, a cerumen protection system with a non-porous membrane disposed in the first housing area, a vent with a first aperture located in the first housing area and a second aperture located in the second housing area, an earpiece with a sound outlet aperture and with a sound canal between the sound outlet aperture and the cerumen protection system.

BACKGROUND OF THE INVENTION

In-the-ear hearing aid devices (ITE) generally have a vent, which creates a passage through the hearing aid device from the housing side (faceplate) facing away from the eardrum when the hearing aid device is in position to the housing side facing the eardrum. This serves to ventilate the volume of the auditory canal enclosed by the hearing aid device, brings about barometric pressure equalization for said volume and reduces the occlusion effect.

Hearing aid devices, in particular in-the-ear hearing aid devices, can become contaminated with ear wax (cerumen). With ITEs the cerumen penetrates into the sound outlet aperture of the hearing aid device and blocks the sound canal between the hearing aid device speaker, also referred to as the earpiece or receiver, and the sound outlet aperture. This leads to a number of problems, from acoustic impairment to the hearing aid device becoming unusable.

There have been a number of approaches with ITEs to date to prevent the ingress of cerumen. Cap or yoke-type protection systems are generally used, which can be configured either as part of the hearing aid device housing (see DE 38 02 250 C1 or U.S. Pat. No. 5,327,500) or as an insert or cover in the sound canal or on the hearing aid device (see U.S. Pat. No. 5,327,500 or EP 0 312 517 A2). Cerumen protection systems which narrow the sound canal are also known, in some instances having lattice or cavity-type barriers and being intended for insertion into the sound canal or positioning on a nozzle (see U.S. Pat. No. 4,972,488; U.S. Pat. No. 5,970,157; WO 00/03561 or DE 36 16 648 A1).

Cleaning such cerumen protection systems is a major problem. In many instances the cerumen protection system has to be replaced from time to time, which means that elderly hearing aid device wearers have to visit the acoustician, which is often problematic. Cerumen protection systems have therefore been repeatedly proposed, which are configured as porous or non-porous (gas-tight) membranes (see EP 310 866 A1; DE 196 40 796 A1 or U.S. Pat. No. 6,164,409) and cover the sound outlet aperture. This largely prevents the ingress of cerumen. Such membranes are also easier to clean than other cerumen protection systems. But it also has to be as simple as possible to replace these when damaged. They cannot therefore be permanently integrated.

Cover-type cerumen protection systems have ultimately not been successful because of the additional space they take up. And the insertable cerumen protection systems used to date generally have the disadvantage of reducing the acoustically active cross-section of the sound canal, which can have acoustic disadvantages.

Gas-tight membranes essentially offer the greatest protection but require the use of modified earpieces to ensure barometric pressure equalization. The associated outlet on the outside of the device (faceplate) also takes up corresponding additional space. It must also be ensured that the cerumen protection system is connected reliably to the sound canal and forms a tight seal therewith. Until now this has generally been achieved, in the case of a cerumen protection system that can be inserted into the sound canal, by a thickening close to the sound canal, which is configured as a flange or barb or has other elements such as studs, knobs, etc.

An earpiece support, with a sound tube between a sound outlet aperture of the earpiece and a holder in the hearing aid device housing, is known from US 2005/0074138 A1.

A hearing aid device according to the preamble of claim 1 is known from U.S. Pat. No. 6,164,409. It is a disadvantage of the known hearing aid device that a modified earpiece is required to ensure barometric pressure equalization.

SUMMARY OF THE INVENTION

The object of the present invention is to achieve the barometric pressure equalization required for the earpiece in a simple manner with an in-the-ear hearing aid device with a cerumen protection system, which does not have a porous membrane.

This problem is resolved by the features listed in the claims.

With conventional hearing aid devices a small sound pipe is present, generally in the form of an elastic sound tube, one end of which is placed over the sound outlet aperture of the earpiece and the other end of which forms the sound outlet aperture of the hearing aid device. In contrast to this, with a hearing aid device according to the invention, the sound canal is only partially in the form of a small sound pipe, e.g. in the form of an elastic sound tube, between the sound outlet aperture of the earpiece and the sound outlet aperture in the housing of the hearing aid device. However part of the sound canal is also made of the same material as the housing of the hearing aid device and the sound canal is connected to the housing to form a single piece. At the same time the last-mentioned part of the sound canal can serve as a holder for the small sound pipe. This part is then advantageously dimensioned so that the small sound pipe can be inserted tightly and therefore held in position. Alternatively or additionally the holding system thus configured can also have at least one molded section in the form of a projection, barb, stud, knobs, peripheral flange, etc., which grips the small sound pipe, thereby securing it further.

In another embodiment, instead of the molded section, at least one indentation is provided in the relevant part of the sound canal, with the small sound pipe used being provided with at least one corresponding outer projection, so that the small sound pipe can be secured in the holder, without thereby reducing the internal diameter of the small sound pipe.

The part of the sound canal pointing in the direction of the eardrum when the hearing aid device is in position is also configured as a holder, to connect a cerumen protection system to the hearing aid device in a detachable manner. The cerumen protection system has a non-porous and therefore air-permeable membrane, which is preferably made of a metal, an alloy or a synthetic material, for example plastic. The membrane is also configured to be relatively thin, so that it transmits the sound generated by the earpiece. The membrane seals the sound canal between the earpiece and the membrane in a gas-tight manner from the inner ear. So that the membrane remains functional, barometric sound equalization must take place for the sound canal. Modified earpieces can be provided for this purpose, producing an air-permeable canal between the back volume of the earpiece and the outside of the hearing aid device or the inner space of the hearing aid device, if the latter in turn has an air-permeable connection to the outside of the hearing aid device. Such modified earpieces are however relatively expensive.

With the invention a pressure equalization canal is therefore provided to ensure barometric pressure equalization of the earpiece, opening into the sound canal between the earpiece and the non-porous membrane. This allows conventional earpieces to be used, which are produced in large numbers and therefore at low cost. The other end of the pressure equalization canal preferably opens into the vent, which is present in any case, instead of being conducted outward in a separate manner. No further housing aperture is therefore required in the housing of the hearing aid device. This saves space and also has acoustic advantages. It can thereby be of advantage if the pressure equalization canal opens into the vent at a point that is relatively distant from the housing side facing the eardrum when the hearing aid device is in position. This largely prevents contamination of the pressure equalization canal by cerumen. In contrast however the pressure equalization canal can also open into the vent at a point closer to the housing side facing the eardrum. The precise arrangement of the point in question preferably also takes into account acoustic conditions. In one specific embodiment the pressure equalization canal can also run directly or at least approximately along the shortest connecting line between the sound canal and the vent.

In another variant of the invention provision is made for the pressure equalization canal to create a passage from the sound canal, which is sealed in an at least approximately air-tight manner, into the inner space of the hearing aid device, said inner space being air-permeable in respect of the area outside the hearing aid device due to holes in the housing, as required for example for the arrangement of control elements or the battery compartment. This measure can also achieve barometric pressure equalization for the sound canal.

The vent can also be configured such that it creates a direct connection from the sound canal between the earpiece and the membrane and the space surrounding the hearing aid device and for example opens out in the faceplate.

With the hearing aid device according to the invention the cerumen protection system preferably includes a non-porous and therefore gas-tight membrane, which is secured in a carrier. The carrier in turn is secured in a holder in the region of the sound outlet aperture in the housing of the hearing aid device or in the sound canal. The holder is thereby advantageously dimensioned such that the cross-section of the sound canal is not narrowed by the cerumen protection system. If it should be necessary to replace the cerumen protection system, this can be done using a suitable tool, it being possible to destroy the membrane of the old cerumen protection system during the replacement process.

A hearing aid device according to the invention is preferably manufactured using a computer-aided production method, wherein data relating to the individual layout of the ear canal of a person is first determined. A virtual image of a hearing aid device is then designed from the digital representation of the internal contours of the relevant ear canal, being a precise fit for the ear canal in question. Components of the hearing aid device (microphones, earpieces, voltage source, electronic system, etc.) can be positioned virtually in this computer model. The location of the cerumen protection system and the holder required to secure it in the housing of the hearing aid device can therefore also be determined using the computer model. It is also possible to plan the start and end points of the pressure equalization canal according to the invention as well as the precise layout of the pressure equalization canal based on the computer model. The shell of the hearing aid device with the integrated holders for the cerumen protection system and the small sound pipe and with the pressure equalization canal according to the invention is then produced in a computer-controlled manufacturing process, for example by laser sintering, stereolithography or a thermojet pressure method. As a result an actual hearing aid device housing is produced precisely according to the image of the three-dimensional computer model.

The in-the-ear hearing aid device according to the invention does not necessarily have to include all the components required to assist a hearing-impaired person. Rather it is also possible for the hearing aid device according to the invention just to contain the earpiece, with all the further electric or electronic components required being contained in a further device, which is worn outside the auditory canal, for example behind the ear. The connection between the further device and the hearing aid device is preferably wired but it can also be configured as an electromagnetic radio connection, etc.

BRIEF DESCRIPTION OF THE DRAWINGS

The invention is described in more detail below with reference to exemplary embodiments.

DETAILED DESCRIPTION OF THE INVENTION

Figure 1:
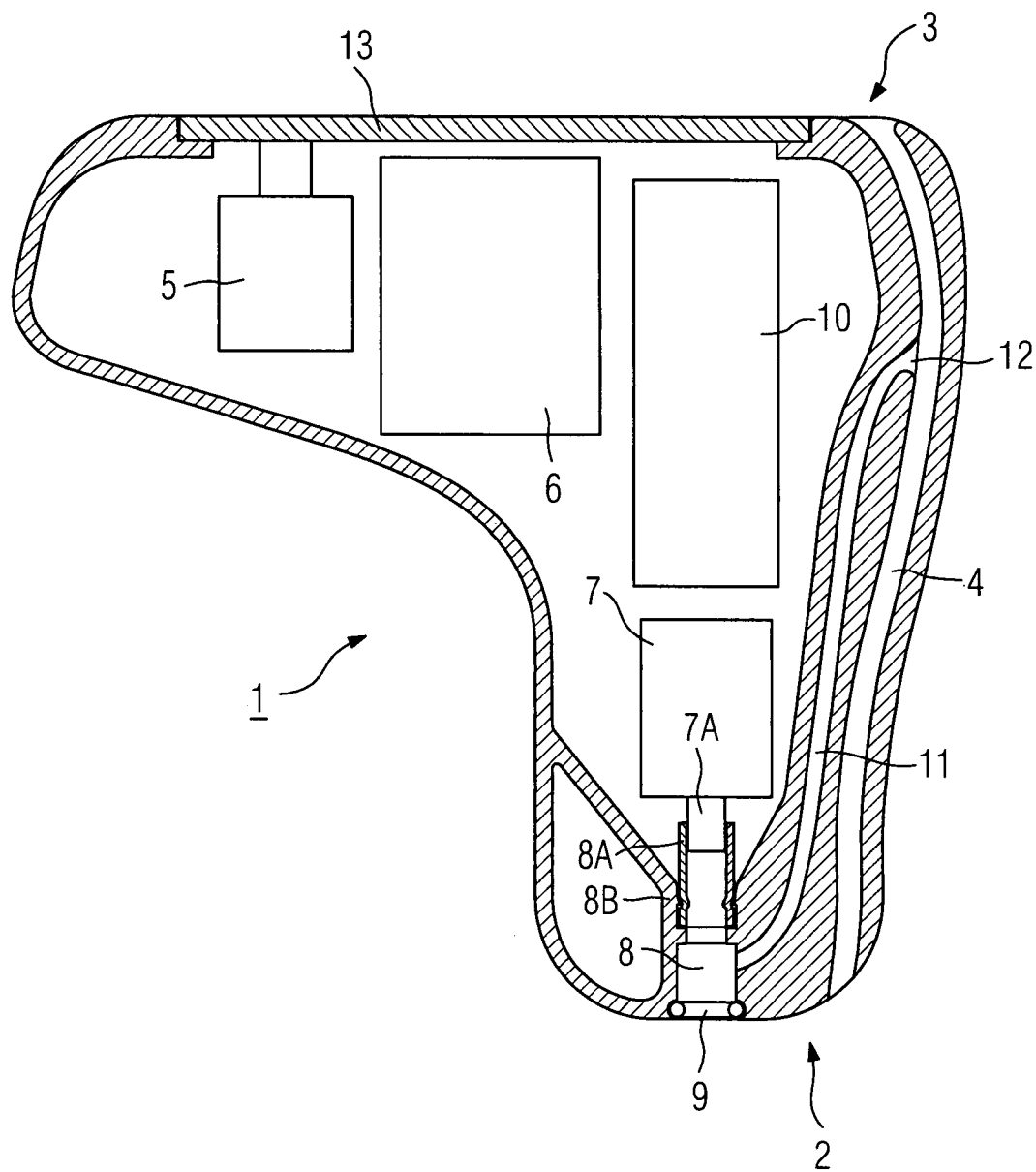
FIG. 1 shows an in-the-ear hearing aid device with a pressure equalization canal according to a first variant of the invention.

With the variant according to FIG. 1 the in-the-ear hearing aid device 1 comprises a housing with a first housing area 2 facing the eardrum of a user when the hearing aid device is in position and a second housing area 3 facing away from the eardrum. The latter is generally referred to as the faceplate. The hearing aid device 1 is traversed between the first and second housing areas by a vent 4 to ventilate the auditory canal volume enclosed by the hearing aid device 1 when said hearing aid device 1 is in position. The housing of the hearing aid device 1 contains at least one microphone 5 to receive an acoustic input signal and convert said signal to an electrical signal, a signal processing unit 6 for processing and frequency-dependent amplification of the electrical signal and an earpiece 7 to convert the processed signal to an acoustic signal, which is fed to the ear of the user by way of a sound canal 8. A voltage source 10 in the form of a standard or rechargeable battery is also present to supply power to the electronic components of the hearing aid device 1. A part 13 of the faceplate 3 can be detached from the rest of the housing to insert and remove the electronic components into and from the hearing aid device 1. This detachable part 13 can in some instances also be provided with control elements (not shown).

A segment of this sound canal 8 is formed by a small sound pipe 8A, one end of which is placed over a sound outlet aperture 7A in the form of a sound outlet collar of the earpiece 7 and the other end of which is secured and fixed in a holder 8B configured as part of the housing. An elastic sound tube can for example be used as the small sound pipe 8A. The front segment of the sound canal 8, in other words the segment opening into the first housing area 2 facing the eardrum, is molded directly by the housing material of the hearing aid device 1 enclosing the sound canal 8. So that the sound canal 8 or earpiece 7 does not become blocked with earwax (cerumen), a cerumen protection system 9 is provided in the region where the sound canal 8 opens into the first housing area 2, to prevent the ingress of cerumen into the sound canal 8.

With the hearing aid device 1 according to the invention the cerumen protection system 9 is provided with a non-porous and therefore gas-impermeable membrane. This means that the sound canal 8 can be sealed in a gas-tight manner between the earpiece 7 and the sound canal aperture without further measures. So that the earpiece 7 remains functional despite air pressure fluctuations, barometric pressure equalization is required for the enclosed volume. According to the invention this is achieved by means of a pressure equalization canal 11, which connects the sound canal 8 to the vent 4 in the exemplary embodiment.

In the exemplary embodiment according to FIG. 1 the pressure equalization canal 11 does not connect the sound canal 8 to the vent 4 by the shortest path. Rather the pressure equalization canal 11 opens out into the vent 4 at a point 12 which is closer to the aperture of the vent 4 in the second housing area 3 (faceplate) than the aperture in the first housing area 2. This influences the acoustic transmission response of the hearing aid device 1 and reduces the tendency to feedback. This configuration of the pressure equalization canal 11 also counteracts possible contamination or blocking, by cerumen for example. Also with this embodiment no aperture is required in the housing shell of the hearing aid device 1 for the pressure equalization canal 11. The pressure equalization canal could however also open out separately in the faceplate 3, thus having no direct connection to the vent 4 (not shown). Then however a further aperture for the pressure equalization canal would have to be provided in the faceplate 3 in addition to the aperture for the vent.

Figure 2:
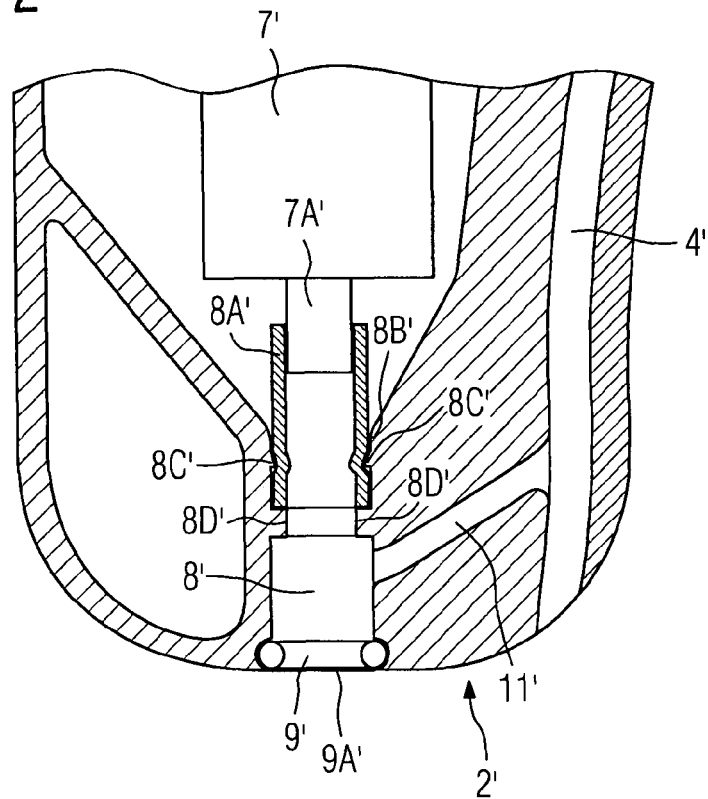
FIG. 2 shows an in-the-ear hearing aid device with a pressure equalization canal according to a second variant of the invention and FIG. 3 shows an in-the-ear hearing aid device with a pressure equalization canal according to a third variant of the invention.

A further exemplary embodiment of a hearing aid device according to the invention in shown in FIG. 2. In contrast to FIG. 1 only the part of the hearing aid device projecting into the auditory canal of a user is shown here however. Like the hearing aid device according to FIG. 1 this hearing aid device also has a first housing area 2' facing the eardrum when the hearing aid device is in position and an earpiece 7' with a sound outlet aperture 7A'. Also with this exemplary embodiment a small sound pipe 8A' forms a segment of the sound canal 8'. A further segment is configured as a single piece with the housing of the hearing aid device and comprises a holder 8B' for the small sound pipe 8A'. This holder has a slightly smaller diameter than the small sound pipe 8A', so that the small sound pipe 8A' is held in the holder. The holder is also advantageously provided with at least one molding (knobs, wedge, flange-type ring etc.), to secure the small sound pipe 8A' further. In the exemplary embodiment the two wedge-shaped moldings 8C' are provided for this purpose. In the exemplary embodiment the holder 8B' for the small sound pipe 8A' also has a further molding 8D', configured as a ring-shaped flange in the sound canal 8' and providing a stop for the small sound pipe 8A', so that the small sound pipe 8A' can only be inserted into the holder provided for this purpose up to said stop.

As in the exemplary embodiment according to FIG. 1, in this exemplary embodiment too a cerumen protection system 9' with an air-impermeable membrane 9A' is present at the end of the sound canal 8', sealing said sound canal 8' in an air-tight manner. The membrane 9A' advantageously forms a seal at least largely flush with the surface of the housing of the hearing aid device, so that the membrane 9A' can be cleaned easily, for example by wiping. According to the invention the pressure should be equalized by means of a pressure equalization canal 11' in this exemplary embodiment too.

In contrast to the exemplary embodiment according to FIG. 1 with this exemplary embodiment the sound canal 8' is connected to the vent 4' by a relatively short path by means of the pressure equalization canal 11'. This impacts on the acoustic transmission response of the hearing aid device in question.

Figure 3:
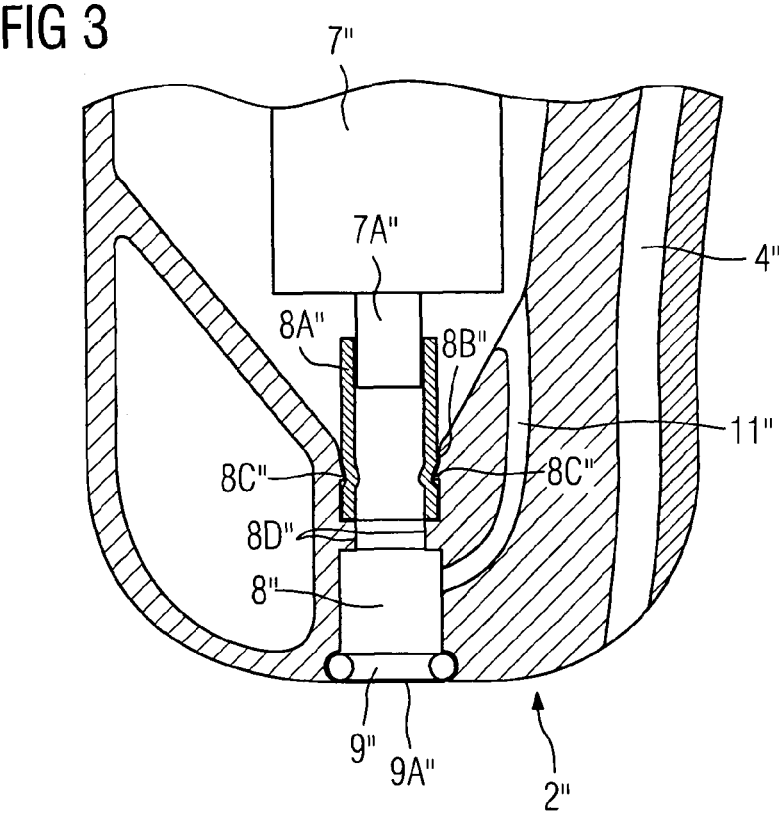

A further embodiment of the invention is shown in FIG. 3. The components shown there with double apostrophe reference characters largely correspond to the components shown in FIGS. 1 and 2. In contrast to the exemplary embodiments shown before, the pressure here is not equalized by way of the vent 4". Instead the pressure equalization canal 11" opens into the inner space of the hearing aid device shown. This is possible, as the housing of the hearing aid device is not fully sealed from the outside, for example due to housing apertures for a battery compartment, control elements, etc., and therefore the barometric pressure equalization can also take place by way of the inner space of the housing.

The in-the-ear hearing aid devices according to the exemplary embodiments are preferably manufactured according to a manufacturing method, for example SLS or SLA, known from the field of rapid prototyping. This has the advantage that a three-dimensional computer model of the respective hearing aid device is generated first, before the actual housing is manufactured as a very precise image of said computer model in a largely automated and computer-controlled manufacturing process. All details of the housing and the housing moldings configured as a single piece with said housing can thus be determined before the actual manufacturing process using the computer model. It is thus possible for example to produce the pressure equalization canal, a holder for the cerumen protection system and a holding system for the small sound pipe, first using the computer model and then in the actual housing.

The invention claimed is:

1. An in-the-ear hearing aid device, comprising:
   a housing comprising:
   a first housing area facing an eardrum of a user when the hearing aid device is in position, and
   a second housing area facing away from the eardrum;
   a vent with a first aperture located in the first housing area and a second aperture located in the second housing area;
   a cerumen protection system with a non-porous membrane disposed in the first housing area;
   an earpiece with a sound outlet aperture;
   a sound canal arranged between the sound outlet aperture and the cerumen protection system; and
   a pressure equalization canal that opens into the sound canal.

2. The in-the-ear hearing aid device as claimed in claim 1, wherein the pressure equalization canal connects the sound canal to the vent.

3. The in-the-ear hearing aid device as claimed in claim 2, wherein the pressure equalization canal is at least approximately a direct connecting line between the vent and the sound canal.

4. The in-the-ear hearing aid device as claimed in claim 2, wherein the pressure equalization canal opens into the vent at a point that is displaced further in a direction of the second housing area.

5. The in-the-ear hearing aid device as claimed in claim 1, wherein the pressure equalization canal connects the sound canal to an inner space of the hearing aid device.

6. The in-the-ear hearing aid device as claimed in claim 1, wherein the pressure equalization canal comprises a smaller cross section than the vent.

7. The in-the-ear hearing aid device as claimed in claim 1, wherein the sound canal comprises a small sound pipe and a segment.

8. The in-the-ear hearing aid device as claimed in claim 7, wherein the segment is formed by the housing of the hearing aid device and comprises a holder for the small sound pipe.

9. The in-the-ear hearing aid device as claimed in claim 7, wherein the holder for the small sound pipe is a single piece with the housing of the hearing aid device.

10. The in-the-ear hearing aid device as claimed in claim 7, wherein the small sound pipe or the holder for the small sound pipe secures and fixes the small sound pipe in the holder.

11. The in-the-ear hearing aid device as claimed in claim 7, wherein the pressure equalization canal opens into the sound canal in an area between the small sound pipe and the cerumen protection system.

12. The in-the-ear hearing aid device as claimed in claim 1, wherein a holder for the cerumen protection system is a single piece with the housing of the hearing aid device.

13. The in-the-ear hearing aid device as claimed in claim 1, wherein the cerumen protection system is detachablely connected to the housing of the hearing aid device.

14. The in-the-ear hearing aid device as claimed in claim 1, further comprising:
   a microphone that receives an acoustic input signal and converts the acoustic input signal to an electrical input signal,
   a signal processing unit that processes and frequency dependently amplifies the acoustic input signal, and
   a voltage source to supply power to the in-the-ear hearing aid device,
   wherein the earpiece converts the processed and amplified acoustic input signal to an acoustic output signal and emits the acoustic output signal into an auditory canal of the user.

15. The in-the-ear hearing aid device as claimed in claim 1, wherein the housing of the hearing aid device is manufactured using a rapid prototyping method.

16. A method for pressure equalizing an in-the-ear hearing aid device, comprising:
   providing a housing comprising a first housing area facing an eardrum of a user when the hearing aid device is in position and a second housing area facing away from the eardrum;
   arranging a vent comprising a first aperture located in the first housing area and a second aperture located in the second housing area;
   disposing a cerumen protection system comprising a non-porous membrane in the first housing area;
   arranging a sound canal between a sound outlet aperture of an earpiece and the cerumen protection system; and
   arranging a pressure equalization canal that opens into the sound canal.

17. The method as claimed in claim 16, wherein the pressure equalization canal connects the sound canal to the vent.

18. The method as claimed in claim 17, wherein the pressure equalization canal is at least approximately a direct connecting line between the vent and the sound canal.

19. The method as claimed in claim 17, wherein the pressure equalization canal opens into the vent at a point that is displaced further in a direction of the second housing area.

20. The method as claimed in claim 16, wherein the pressure equalization canal connects the sound canal to an inner space of the hearing aid device.

* * * * *